US010094467B2

(12) United States Patent
Kato et al.

(10) Patent No.: US 10,094,467 B2
(45) Date of Patent: Oct. 9, 2018

(54) SHIFT DEVICE FOR VEHICLE

(71) Applicants:TOYOTA JIDOSHA KABUSHIKI KAISHA, Toyota-shi, Aichi-ken (JP); TSUDA INDUSTRIES CO., LTD., Kariya-shi, Aichi-ken (JP); KABUSHIKI KAISHA TOKAI RIKA DENKI SEISAKUSHO, Niwa-gun, Aichi (JP); MANNOH INDUSTRIAL CO., LTD., Anjo, Aichi (JP)

(72) Inventors: Shori Kato, Tajimi (JP); Etsuo Shimizu, Toyota (JP); Takayoshi Kitahara, Nagoya (JP); Saburo Kato, Toyota (JP); Hironori Mizuno, Ichinomiya (JP); Takayoshi Masuda, Anjo (JP); Hideaki Ito, Inuyama (JP)

(73) Assignees: TOYOTA JIDOSHA KABUSHIKI KAISHA, Toyota (JP); TSUDA INDUSTRIES CO., LTD., Kariya (JP); KABUSHIKI KAISHA TOKAI RIKA DENKI SEISAKUSHO, Niwa-gun (JP); MANNOH INDUSTRIAL CO., LTD., Anjo (JP)

( * ) Notice: Subject to any disclaimer, the term of this patent is extended or adjusted under 35 U.S.C. 154(b) by 360 days.

(21) Appl. No.: 15/152,405

(22) Filed: May 11, 2016

(65) Prior Publication Data

US 2016/0341305 A1  Nov. 24, 2016

(30) Foreign Application Priority Data

May 19, 2015  (JP) ................................ 2015-102269

(51) Int. Cl.
*F16H 59/02* (2006.01)
*B60K 20/04* (2006.01)
*F16H 59/10* (2006.01)

(52) U.S. Cl.
CPC ......... *F16H 59/0278* (2013.01); *B60K 20/04* (2013.01); *F16H 59/10* (2013.01); *F16H 2059/0282* (2013.01)

(58) Field of Classification Search
CPC .................... F16H 59/0278; F16H 2059/0282
See application file for complete search history.

(56) References Cited

U.S. PATENT DOCUMENTS 5,588,329 A * 12/1996 Nedachi ................. B60K 20/02
                                                        403/326
9,016,969 B2 * 4/2015 Yang ......................... F16B 3/04
                                                        403/109.2
(Continued)

FOREIGN PATENT DOCUMENTS

CN      104251302 A    12/2014
EP        1953423 A2    8/2008
(Continued)

*Primary Examiner* — Terence Boes
(74) *Attorney, Agent, or Firm* — Oliff PLC

(57) ABSTRACT

A shift device includes a housing and a shift lever having a cylindrical shaft portion with a proximal end pivotably supported inside the housing, shaft portion elongated holes extending through a shaft portion peripheral wall and elongated in a shaft portion longitudinal direction, a shift knob fixed to a shaft portion distal end, a detent pin inserted through the elongated holes where both ends of the pin protrude from the elongated holes, and a detent rod inserted in the shaft portion, the rod transmitting operating force of an operating button in the knob to the pin. The pin has a fitting protrusion protruded toward the rod. The rod has a fitting hole at its end. The protrusion is fitted in the fitting hole. A retaining pawl engaged with an engaging recess provided in the pin or engaged with one of the elongated holes is provided at the rod end.

6 Claims, 22 Drawing Sheets

(56) References Cited

U.S. PATENT DOCUMENTS

| | | | |
|---|---|---|---|
| 9,441,728 B2* | 9/2016 | Nishijima | G05G 1/06 |
| 2015/0000451 A1 | 1/2015 | Yamamoto et al. | |
| 2016/0348784 A1* | 12/2016 | Kato | F16H 59/0278 |

FOREIGN PATENT DOCUMENTS

| | | | |
|---|---|---|---|
| EP | 2818764 A2 | 12/2014 |
| JP | H08-91078 A | 4/1996 |
| JP | 2012-056430 A | 3/2012 |

* cited by examiner

SHIFT DEVICE FOR VEHICLE

INCORPORATION BY REFERENCE

The disclosure of Japanese Patent Application No. 2015-102269 filed on May 19, 2015 including the specification, drawings and abstract is incorporated herein by reference in its entirety.

BACKGROUND

1. Technical Field

The disclosure relates to a shift device for a vehicle and, more particularly, to a technique for preventing disengagement of a detent rod from a detent pin.

2. Description of Related Art

There is known a shift device for a vehicle. The shift device includes a shift lever. The shift lever includes a cylindrical shaft portion and a shift knob. The proximal end of the cylindrical shaft portion is pivotably supported inside a housing. The shift knob is fixed to the distal end of the cylindrical shaft portion. The cylindrical shaft portion has elongated holes. Each of the elongated holes extends through the peripheral wall of the cylindrical shaft portion, and is elongated in the longitudinal direction of the cylindrical shaft portion. A detent pin is inserted through the elongated holes such that both ends of the detent pin protrude from the elongated holes. An operating button is provided in the shift knob. A detent rod transmits operating force of the operating button to the detent pin. The detent rod is inserted in the cylindrical shaft portion. This is, for example, a shift device for a vehicle, described in Japanese Patent Application Publication No. 2012-56430 (JP 2012-56430 A). In the shift device for a vehicle, described in JP 2012-56430 A, in a state where an engaging protrusion protruding from the detent rod toward the detent pin is engaged with an engaging hole provided in the detent pin, the detent pin is urged toward the detent rod by a spring. Thus, the detent pin and the detent rod are assembled to each other.

However, in the shift device for a vehicle, described in JP 2012-56430 A, as the urging force of the spring that urges the detent pin toward the detent rod decreases, there is a possibility that the detent rod and the detent pin are disengaged from each other.

SUMMARY

The disclosure provides a shift device for a vehicle, in which disengagement of a detent rod from a detent pin is prevented.

An aspect of the disclosure provides a shift device for a vehicle. The shift device includes a housing and a shift lever. The shift lever includes a cylindrical shaft portion of which a proximal end is pivotably supported inside the housing, the cylindrical shaft portion having elongated holes that extend through a peripheral wall of the cylindrical shaft portion and that are elongated in a longitudinal direction of the cylindrical shaft portion, a shift knob fixed to a distal end of the cylindrical shaft portion, a detent pin inserted through the elongated holes in a state where both ends of the detent pin protrude from the corresponding elongated holes, and a detent rod inserted in the cylindrical shaft portion, the detent rod being configured to transmit operating force of an operating button provided in the shift knob to the detent pin. The detent pin has a fitting protrusion protruded toward the detent rod. The detent rod has a fitting hole at its end. The fitting protrusion is fitted in the fitting hole. A retaining pawl that is engaged with an engaging recess provided in the detent pin or engaged with one of the elongated holes is provided at the end of the detent rod. In an assembled state, radial movement of the retaining pawl is restricted between the fitting protrusion and the cylindrical shaft portion, and disengagement of the retaining pawl is blocked.

With the shift device according to the above aspect, the retaining pawl that is engaged with the engaging recess provided in the detent pin or engaged with one of the elongated holes provided in the cylindrical shaft portion is provided at the end of the detent rod, and, in the assembled state, radial movement of the retaining pawl is restricted between the cylindrical shaft portion and the fitting protrusion protruded from the detent pin, and disengagement of the retaining pawl is blocked. Therefore, disengagement of the detent rod from the detent pin is prevented.

The shift lever may further include a spring, and the detent pin may be constantly urged by the spring toward the detent rod. For this reason, in the assembled state of the detent pin and the detent rod, the detent rod is located inside the cylindrical shaft portion such that radial movement of the retaining pawl of the detent rod is restricted. Thus, disengagement of the detent rod from the detent pin is prevented.

The retaining pawl may include an elastically deformable neck and an inward latch pawl that protrudes from a distal end of the neck toward the fitting protrusion and that is hooked to the engaging recess, and, in the assembled state, movement of the inward latch pawl toward the cylindrical shaft portion may be restricted between the fitting protrusion and the cylindrical shaft portion, and disengagement of the inward latch pawl may be blocked. For this reason, disengagement of the retaining pawl from the engaging recess is blocked. Thus, disengagement of the detent rod from the detent pin is prevented.

The retaining pawl may include an elastically deformable neck and an outward latch pawl that protrudes from a distal end of the neck toward the cylindrical shaft portion and that is hooked to one of the elongated holes, and, in the assembled state, movement of the outward latch pawl toward the fitting protrusion may be restricted between the fitting protrusion and the cylindrical shaft portion, and disengagement of the outward latch pawl may be blocked. For this reason, disengagement of the retaining pawl from the elongated hole is blocked. Thus, disengagement of the detent rod from the detent pin is prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the shift device for a vehicle according to the disclosure will be described in detail with reference to the accompanying drawings.

First Embodiment

Figure 1:
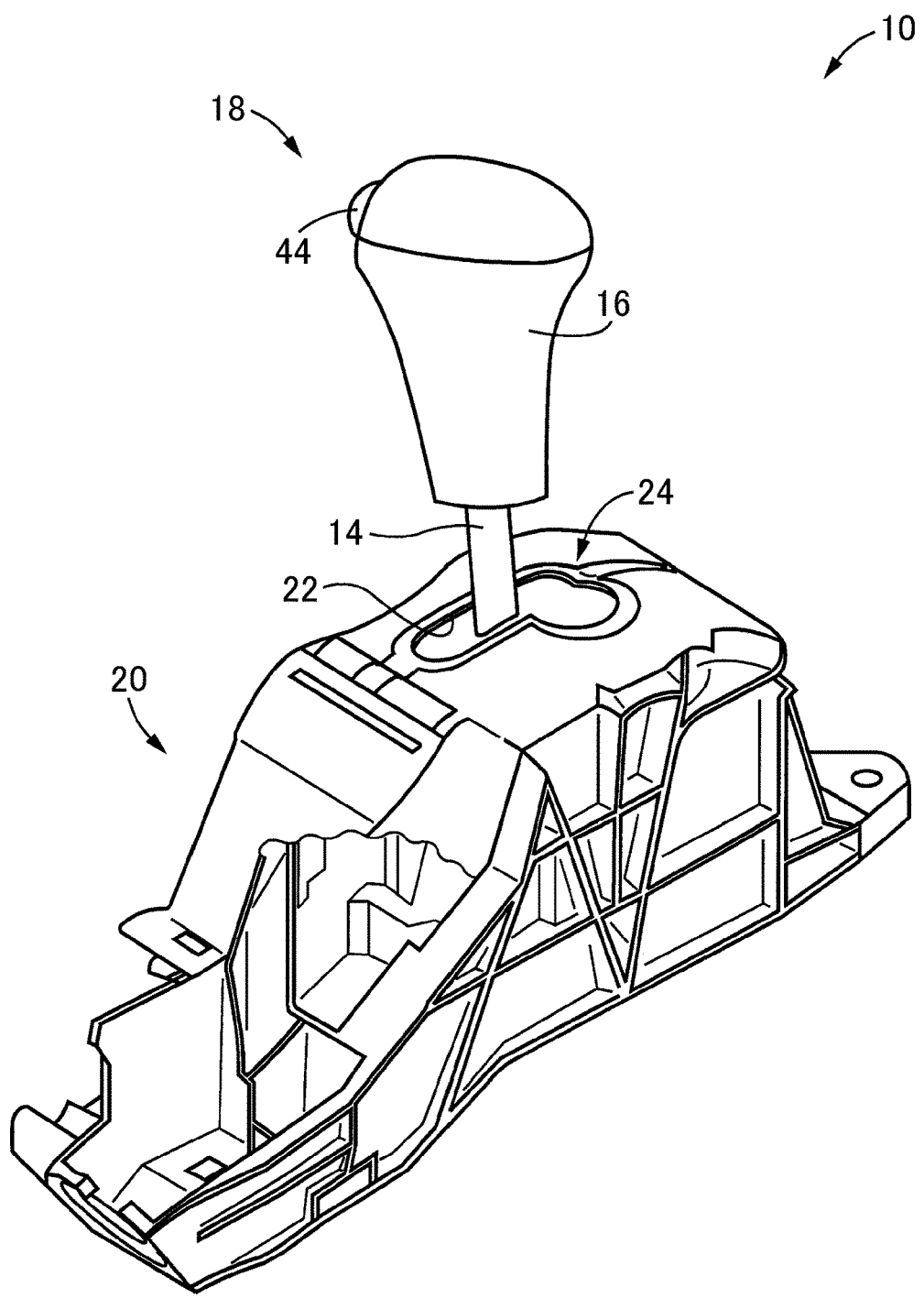
FIG. 1 is a perspective view of a shift device for a vehicle according to an embodiment of the disclosure.
Figure 4:
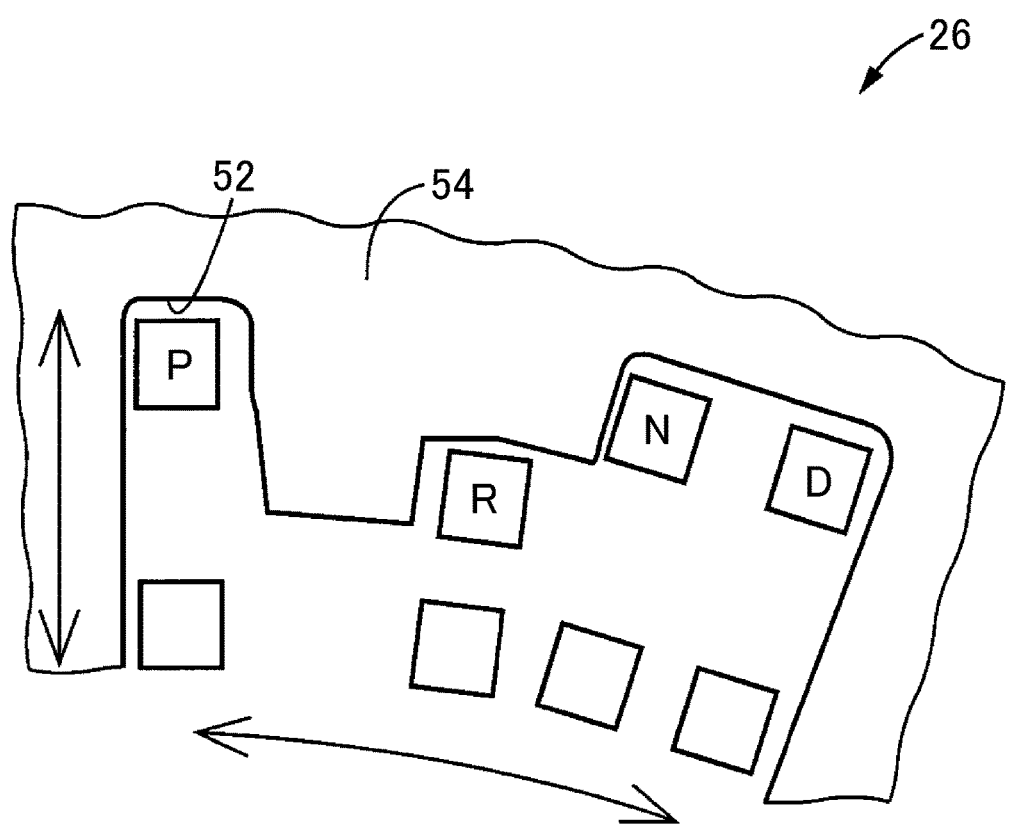
FIG. 4 is a view of one of detent plates provided in a housing of the shift device for a vehicle, shown in FIG. 1.

FIG. 1 is a perspective view of a shift device 10 for a vehicle according to a first embodiment of the disclosure. The shift device 10 includes a shift lever 18, a bearing member (not shown), a control lever (not shown), and a housing 20. The shift lever 18 includes a lever pipe 14 and a shift knob 16. The lever pipe 14 is supported such that the proximal end is pivotably supported via a spherical proximal end 12 (shown in FIG. 2). The lever pipe 14 functions as a cylindrical shaft portion. The shift knob 16 is fixed to the distal end of the lever pipe 14. The bearing member has a spherical bearing surface that receives the spherical proximal end 12 and that is slidable on the spherical proximal end 12. The control lever is assembled to the shift lever 18, and transmits operation of the shift lever 18 in a shift direction to an automatic transmission via a cable (not shown). The housing 20 accommodates the bearing member and the lower end of the shift lever 18 and control lever, and is fixed to a floor, or the like, in a vehicle cabin. The shift lever 18 is provided upright on the housing 20 so as to be pivotable in the shift direction or a select direction around the center of the spherical proximal end 12 slidably supported by the bearing member. The housing 20 includes a shift gate 24 as its upper wall face. The shift gate 24 is a plate-shaped member having a guide slot 22. The guide slot 22 allows the lever pipe 14 of the shift lever 18 to extend therethrough, and guides the shift lever 18 to any one of shift positions, such as a parking position (P position), a reverse position (R position), a neutral position (N position) and a drive position (D position). Detent plates 26 are provided in the housing 20 as shown in FIG. 4. Each of the detent plates 26 has a wall shape. The detent plates 26 are used to regulate a shift operation, for example, an operation to change the shift position between the parking position and the reverse position, that is, a non-parking position, by placing the shift lever 18 to any one of the above-described shift positions.

Figure 2:
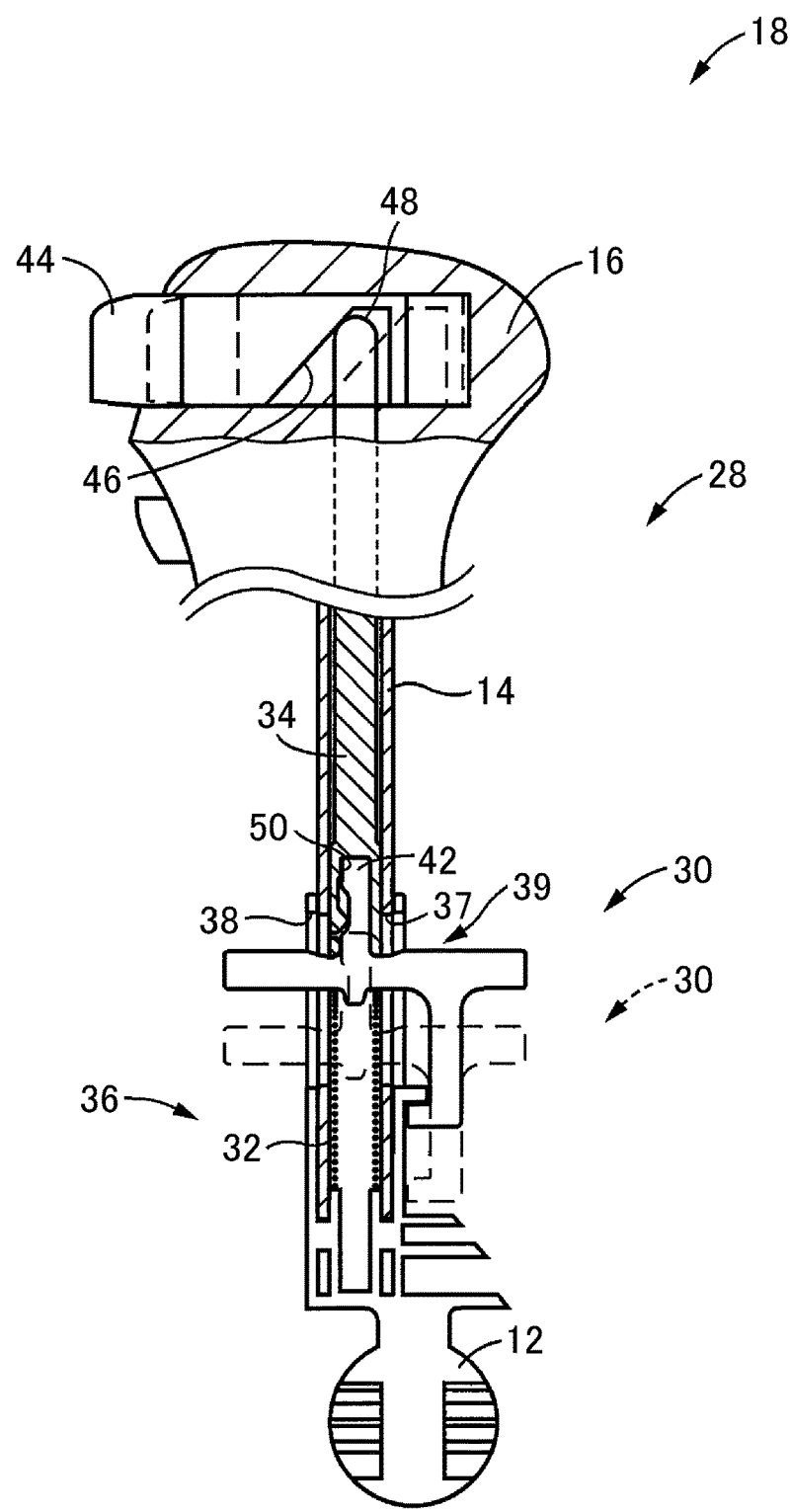
FIG. 2 is a cross-sectional view of a shift lever of the shift device for a vehicle, shown in FIG. 1, with part cut away.
Figure 3:
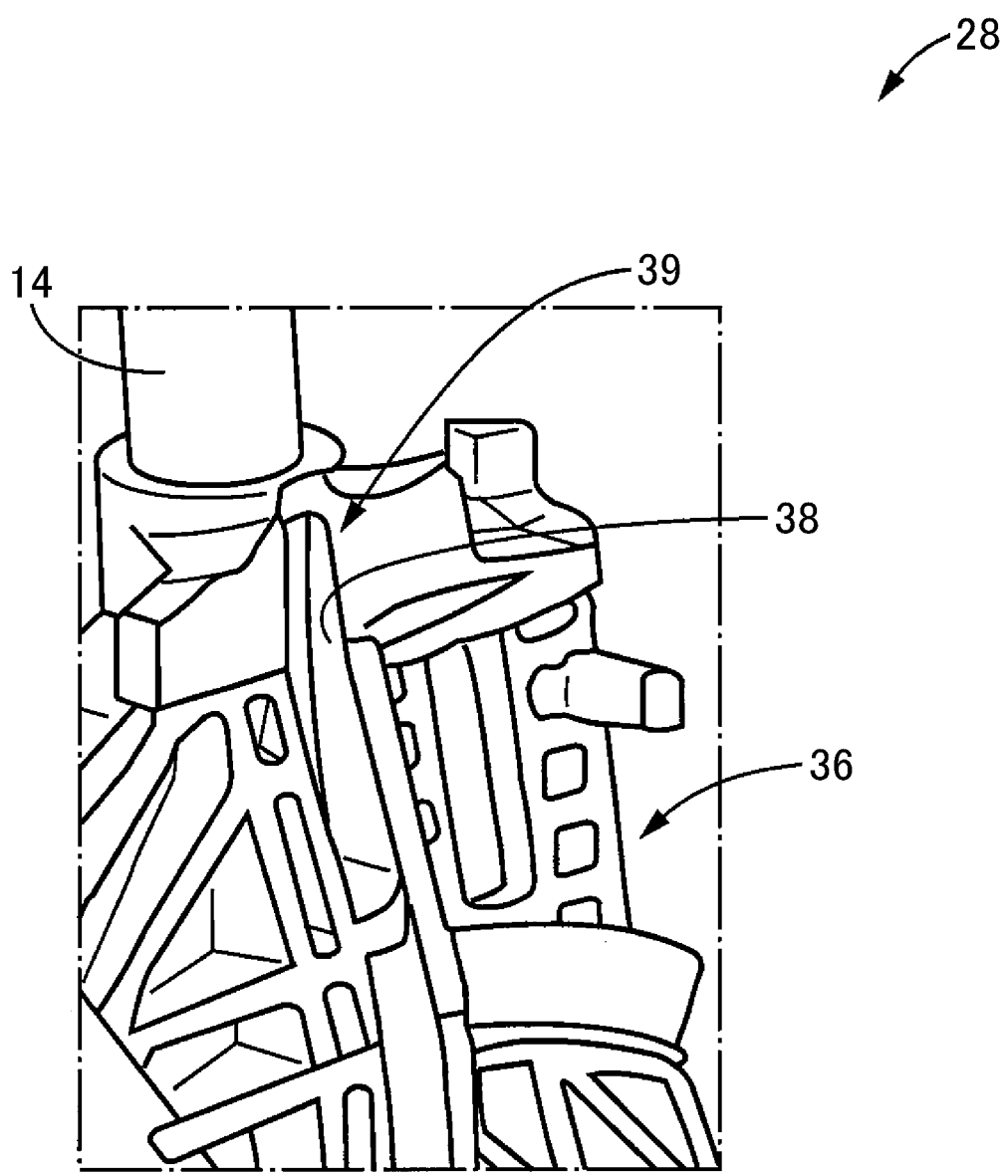
FIG. 3 is an enlarged perspective view of one of elongated holes provided in an assembly of the shift lever shown in FIG. 2.

FIG. 2 is a cross-sectional view of the shift lever 18 accommodated in the housing 20 of the shift device 10. The shift lever 18 includes an assembly 28 (lever subassy), a detent pin 30, a spring 32, a detent rod 34, and the shift knob 16. The assembly 28 includes the cylindrical lever pipe 14, a support portion 36 and the spherical proximal end 12. The lever pipe 14 is made of resin. The support portion 36 includes a cylindrical hole and a columnar hole. The cylindrical hole fixes the lever pipe 14 inside by allowing the proximal end of the lever pipe 14 to be fitted therein. The columnar hole has an annular end face that is provided on the radially inner side of the cylindrical hole and that supports one end of the spring 32. The spring 32 has an outside diameter smaller than the inside diameter of the lever pipe 14. The spherical proximal end 12 is formed on the vehicle lower side of the support portion 36. FIG. 3 is an enlarged perspective view of part of the assembly 28. The assembly 28 has a pair of elongated holes 39 for the detent pin, which are used to insert the detent pin 30 in a direction perpendicular to the assembly 28. Each of the pair of elongated holes 39 is formed of a lever pipe-side elongated hole 37 and a support portion-side elongated hole 38 so as to be elongated in the axial direction of the lever pipe 14. The lever pipe-side elongated hole 37 extends through the peripheral wall of the lever pipe 14 in a direction perpendicular to the axial direction of the lever pipe 14. The support portion-side elongated hole 38 extends through the peripheral wall of the support portion 36, facing the lever pipe-side elongated hole 37. The detent pin 30 is inserted in the elongated holes 39 in a state where both ends of the detent pin 30 protrude from the corresponding elongated holes 39. The detent pin 30 includes a fitting protrusion 42 provided so as to protrude toward the detent rod 34, that is, the upper side in FIG. 2. The shift knob 16 includes a knob button 44. The knob button 44 functions as an operating button provided so as to be movable in a direction perpendicular to the axial direction of the lever pipe 14 and urged by a spring (not shown) in a protruded direction. The detent rod 34 includes a hemispherical surface 48 at its upper end and a fitting hole 50 at its lower end. The hemispherical surface 48 is in contact with a cam face 46 of the knob button 44. The fitting protrusion 42 of the detent pin 30 is fitted to the fitting hole 50. The detent rod 34 is inserted in the lever pipe 14 and fitted to the detent pin 30 so as to be able to transmit operating force of the knob button 44 provided in the shift knob 16 to the detent pin 30. The detent pin 30 is constantly urged by the spring 32 arranged at the support portion 36 of the assembly 28 toward the detent rod 34 in a direction opposite to the direction of the operating force of the knob button 44. Both ends of the detent pin 30 are respectively engaged with the detent plates 26 (described later).

As the knob button 44 is moved from the position indicated by the continuous line to the position indicated by the dashed line as a result of pressing operation of the knob button 44 of the shift knob 16, the detent pin 30 is moved away from the detent rod 34 downward from the position indicated by the continuous line in FIG. 2 to the position indicated by the dashed line by the operating force of the knob button 44, which is transmitted via the detent rod 34, against the urging force of the spring 32 toward the detent rod 34. FIG. 4 is a view that shows one of the detent plates 26 provided in the housing 20. A shift operation direction of the shift lever 18 is indicated by the horizontal arrow, and an actuating direction of the detent pin 30 is indicated by the vertical arrow. Each detent plate 26 includes detent grooves 52 and a regulating wall 54. The detent grooves 52 respectively correspond to the shift positions, that is, the parking position (P position), the reverse position (R position), the neutral position (N position) and the drive position (D position), with which the detent pin 30 is engaged. The regulating wall 54 regulates shift operation of the shift lever 18, which is indicated by the horizontal arrow in FIG. 4. When the knob button 44 is not operated, the detent pin 30 is engaged with the detent groove 52 corresponding to any one of the shift positions of each detent plate 26 by the urging force of the spring 32. The regulating wall 54 restricts movement of the detent pin 30 between the parking position and the reverse position and movement of the detent pin 30 from the neutral position to the reverse position to restrict corresponding shift operations of the shift lever 18 when the knob button 44 is not operated. As the knob button 44 is operated, the detent pin 30 to which the operating force of the knob button 44 is transmitted via the detent rod 34 is moved to any one of the positions indicated by the squares at the lower side in FIG. 4 and corresponding to the detent groove 52 of each shift position, and is allowed to move in the shift operation direction. Thus, an operation to change the shift position between the parking position and the reverse position and an operation to change the shift position of the shift lever 18 from the neutral position to the reverse position are enabled. As the operation of the knob button 44 is ended, the detent pin 30 is moved toward the detent rod 34 by the urging force of the spring 32, and is engaged with the pair of detent grooves 52 corresponding to any changed one of the shift positions.

Figure 5:
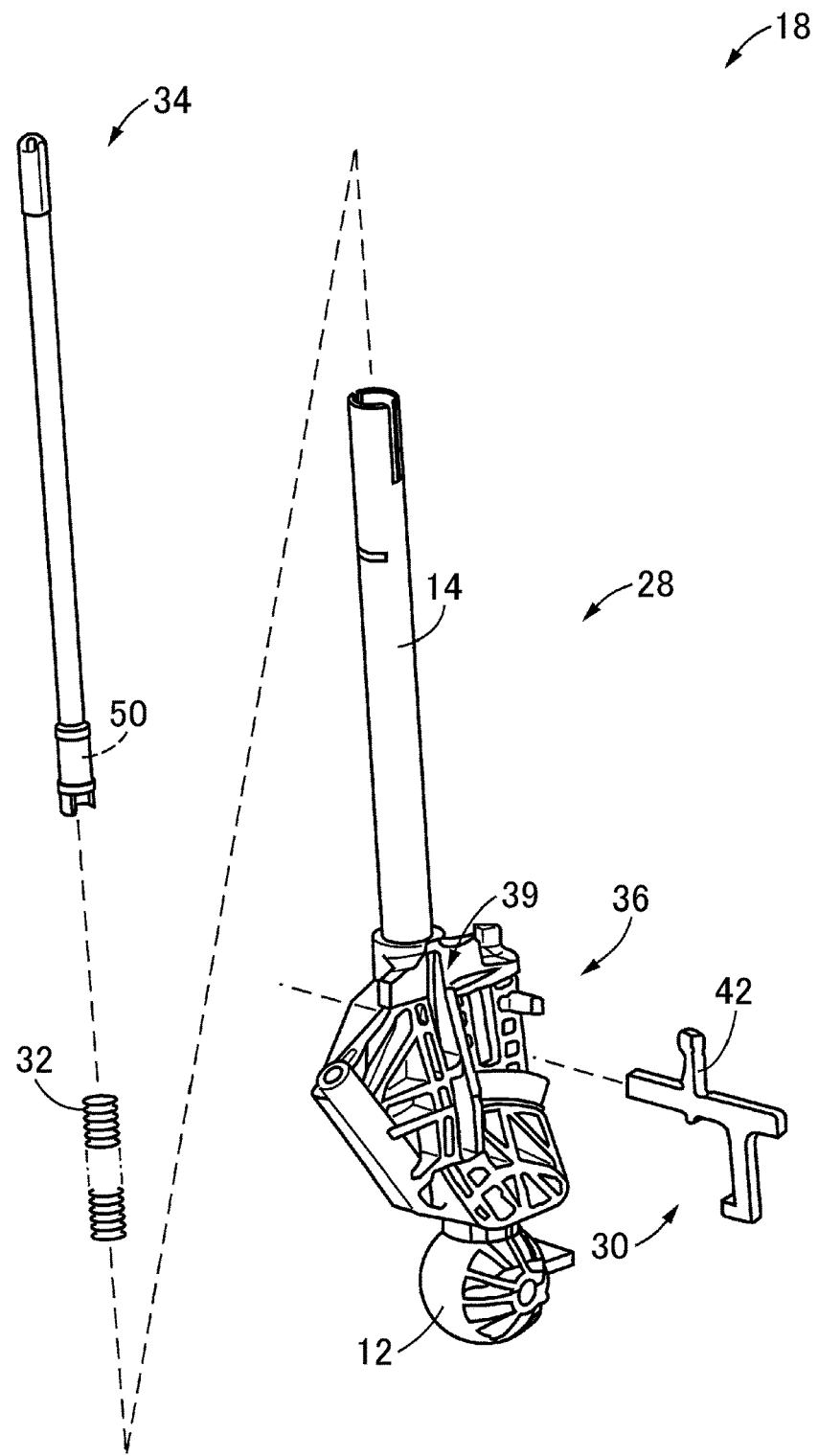
FIG. 5 is a perspective view that separately shows the assembly, a spring, a detent pin and a detent rod that constitute the shift lever shown in FIG. 2.
Figure 6:
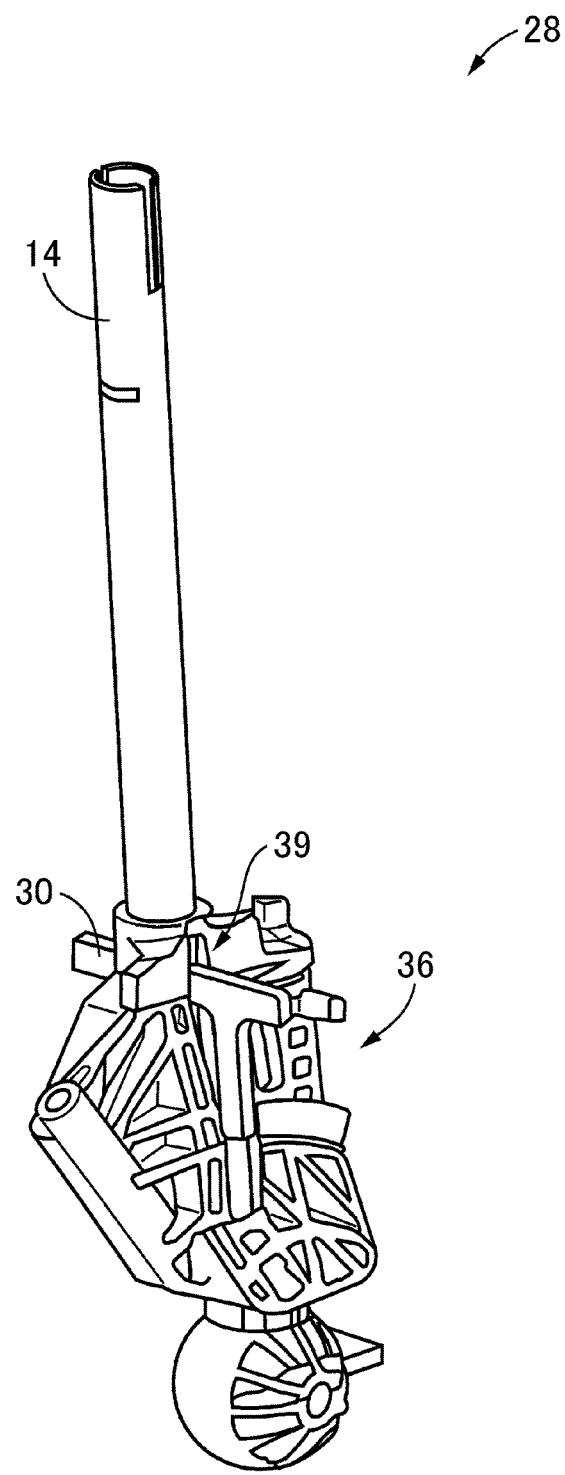
FIG. 6 is a perspective view that shows a state where the spring and the detent pin are arranged in the assembly shown in FIG. 5.
Figure 7:
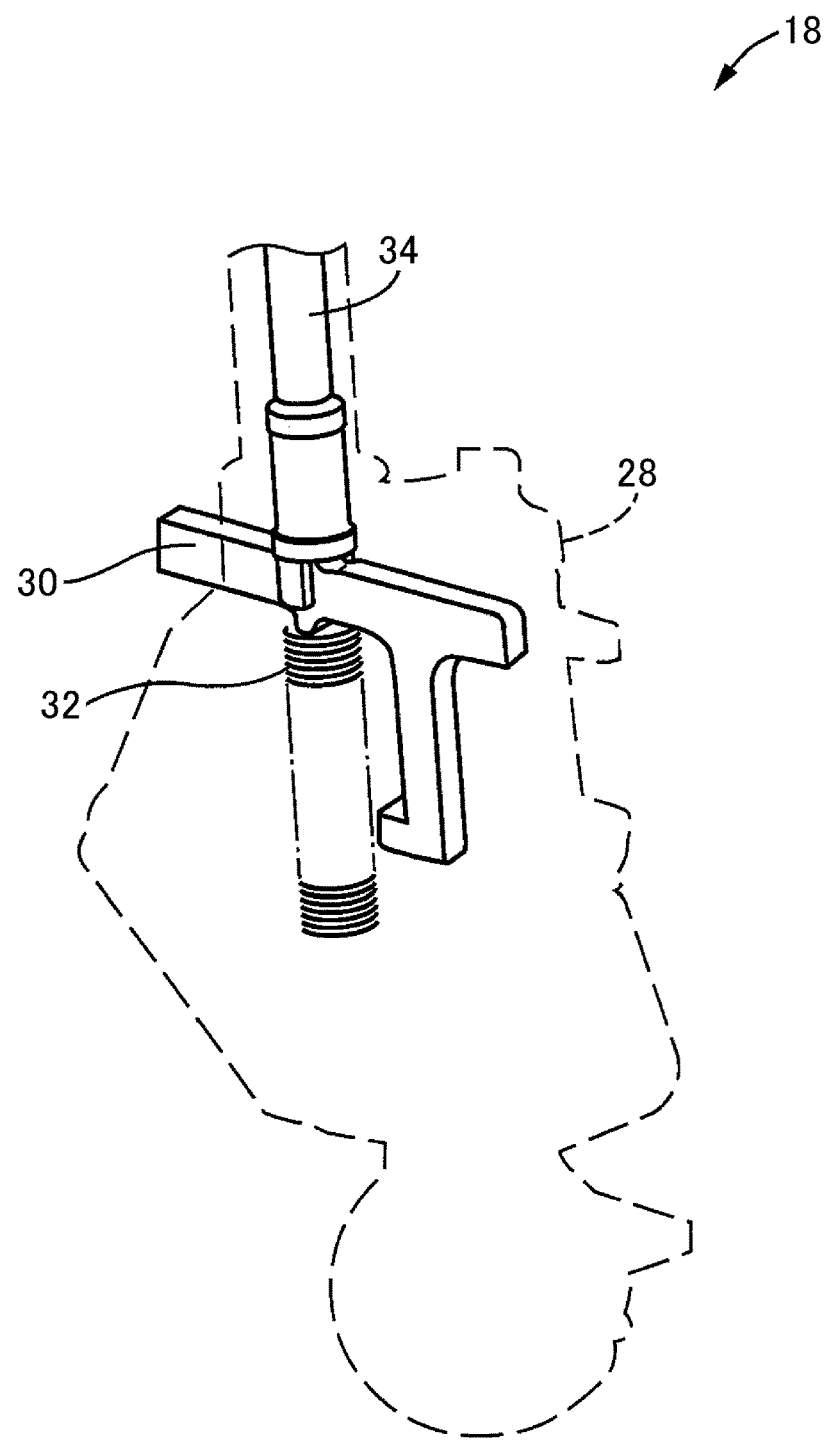
FIG. 7 is a view that shows an assembled state of the shift lever including the assembly shown in FIG. 5, the spring, the detent pin and the detent rod.

FIG. 5 is a perspective view that separately shows the assembly 28, the detent rod 34, the detent pin 30 and the spring 32 before assembling, which constitute the shift lever 18 accommodated in the housing 20 of the shift device 10. The shift lever 18 is assembled in accordance with the following steps. Initially, the spring 32 is inserted from the upper opening of the lever pipe 14 of the assembly 28, and then the lower end of the spring 32 is supported by the annular end face of the support portion 36. Subsequently, the detent pin 30 is inserted into the elongated holes 39 of the assembly 28 from one of both ends of the detent pin 30, and the detent pin 30 is located such that the fitting protrusion 42 is located at the center line of the lever pipe 14. FIG. 6 is a perspective view of the shift lever 18 in a state where the spring 32 and the detent pin 30 are arranged in the assembly 28. Subsequently, the detent rod 34 is inserted into the opening of the lever pipe 14 from its lower end at which the fitting hole 50 is provided, and the fitting hole 50 of the detent rod 34 is fitted to the fitting protrusion 42 of the detent pin 30. FIG. 7 is a view that shows an assembled state of the spring 32, detent pin 30 and detent rod 34 inside the assembly 28 of the shift lever 18. The assembly 28 is indicated by the dashed line.

Figure 8:
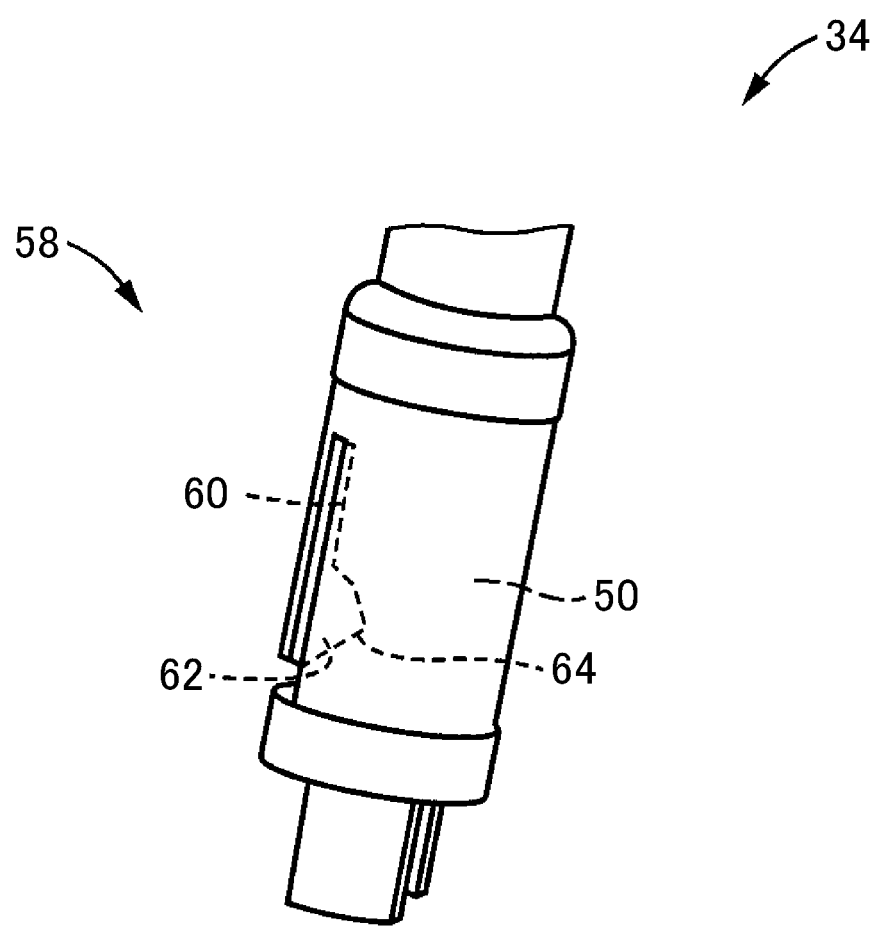
FIG. 8 is an enlarged view of the lower end of the detent rod shown in FIG. 5.
Figure 9:
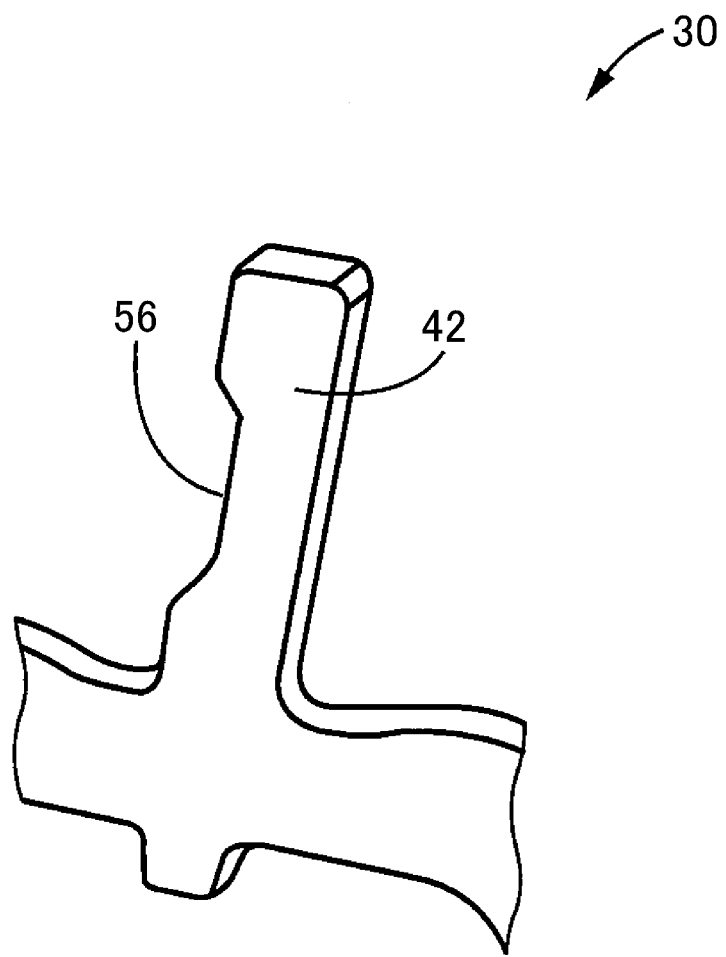
FIG. 9 is an enlarged view of a portion around a fitting protrusion of the detent pin shown in FIG. 5.

FIG. 8 is an enlarged view of the lower end of the detent rod 34. FIG. 9 is an enlarged view of a portion around the fitting protrusion 42 of the detent pin 30. The detent pin 30 has an engaging recess 56 at one of side wall faces of the fitting protrusion 42 in the longitudinal direction of the detent pin 30. The detent rod 34 includes a retaining pawl 58 at its lower end. The retaining pawl 58 is engaged with the engaging recess 56. The retaining pawl 58 includes an elastically deformable neck 60 and an inward latch pawl 62. The neck 60 extends downward in a thin plate shape from part of the upper edge of a rectangular cutout formed in the peripheral wall of the fitting hole 50 in the axial direction. The inward latch pawl 62 protrudes inward from the distal end of the neck 60 toward the center of the fitting hole 50, that is, the fitting protrusion 42 of the detent pin 30, and is hooked to the engaging recess 56 provided in the fitting protrusion 42 of the detent pin 30. The inward latch pawl 62 has a guide inclined face 64 that guides the inward latch pawl 62 to the engaging recess 56 by opening the neck 60 outward while being in sliding contact with the protruded edge of the fitting protrusion 42. The outside diameter of the peripheral wall of the fitting hole 50 provided at the lower end of the detent rod 34 is substantially equal to the inside diameter of the lever pipe 14 such that the detent rod 34 is insertable into the lever pipe 14.

Figure 10:
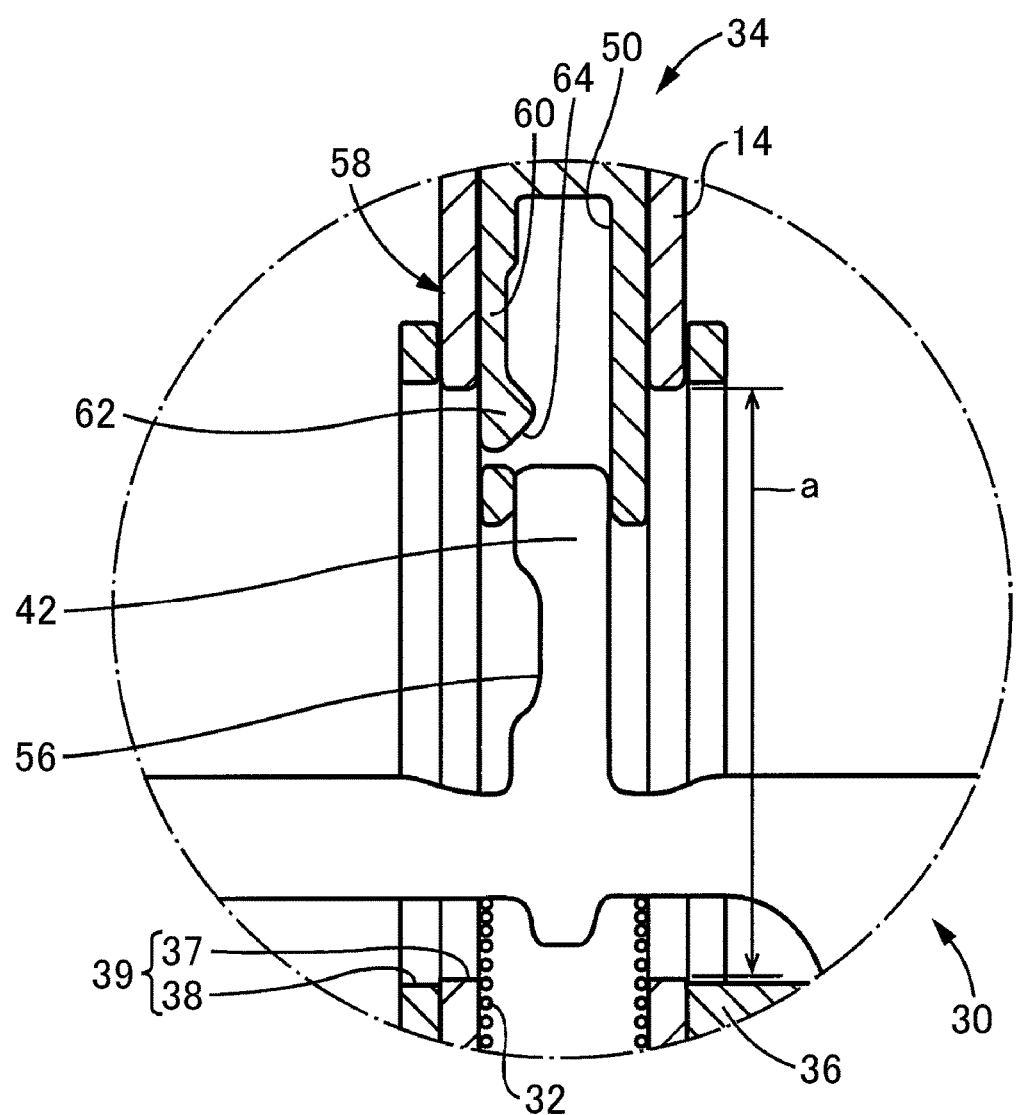
FIG. 10 is a cross-sectional view taken along a plane including the axis of a lever pipe, showing a state just before an inward latch pawl of the detent rod reaches a protruded edge of the fitting protrusion of the detent pin in a step of assembling the detent pin and the detent rod shown in FIG. 5.
Figure 11:
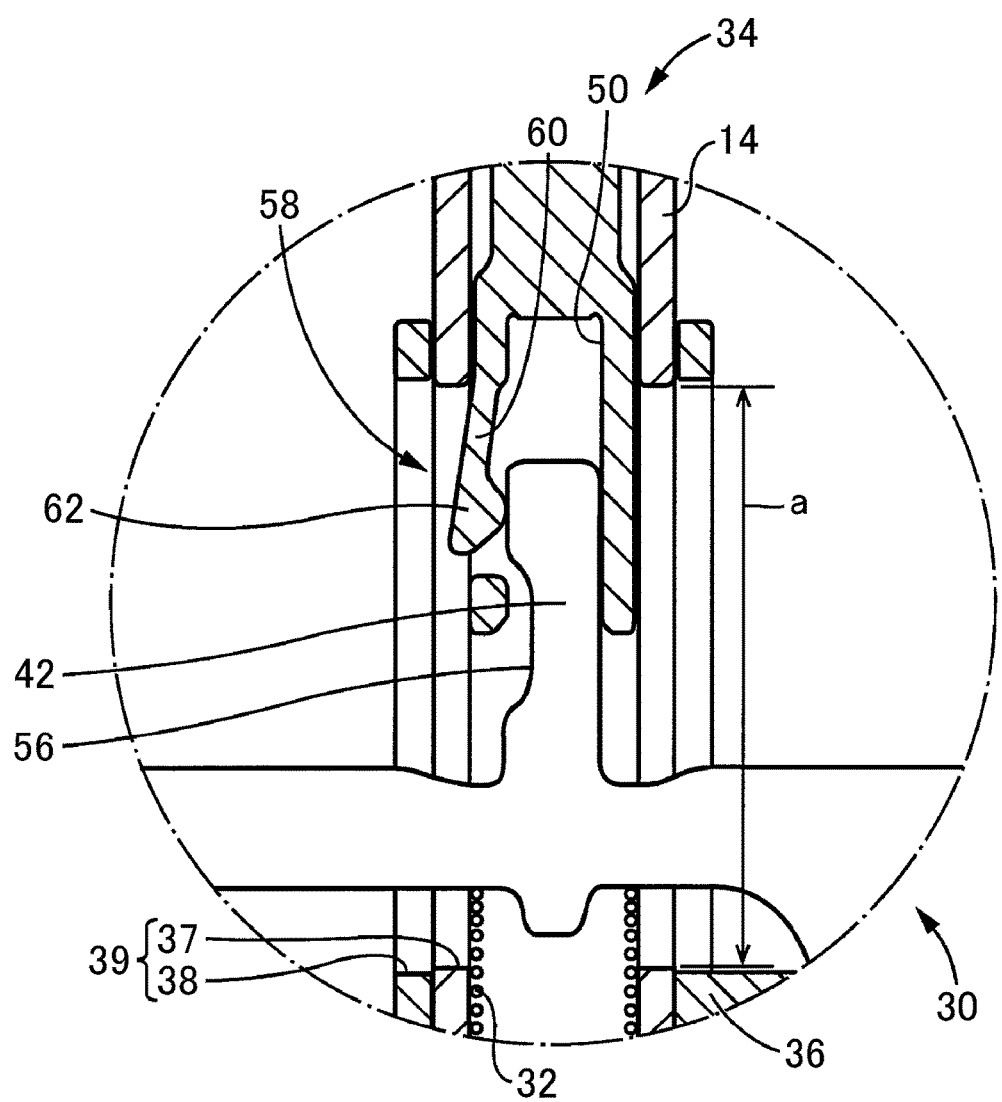
FIG. 11 is a cross-sectional view corresponding to FIG. 10 and showing a state where the inward latch pawl of the detent rod shown in FIG. 5 has moved radially outward through an elongated hole for the detent pin.
Figure 12:
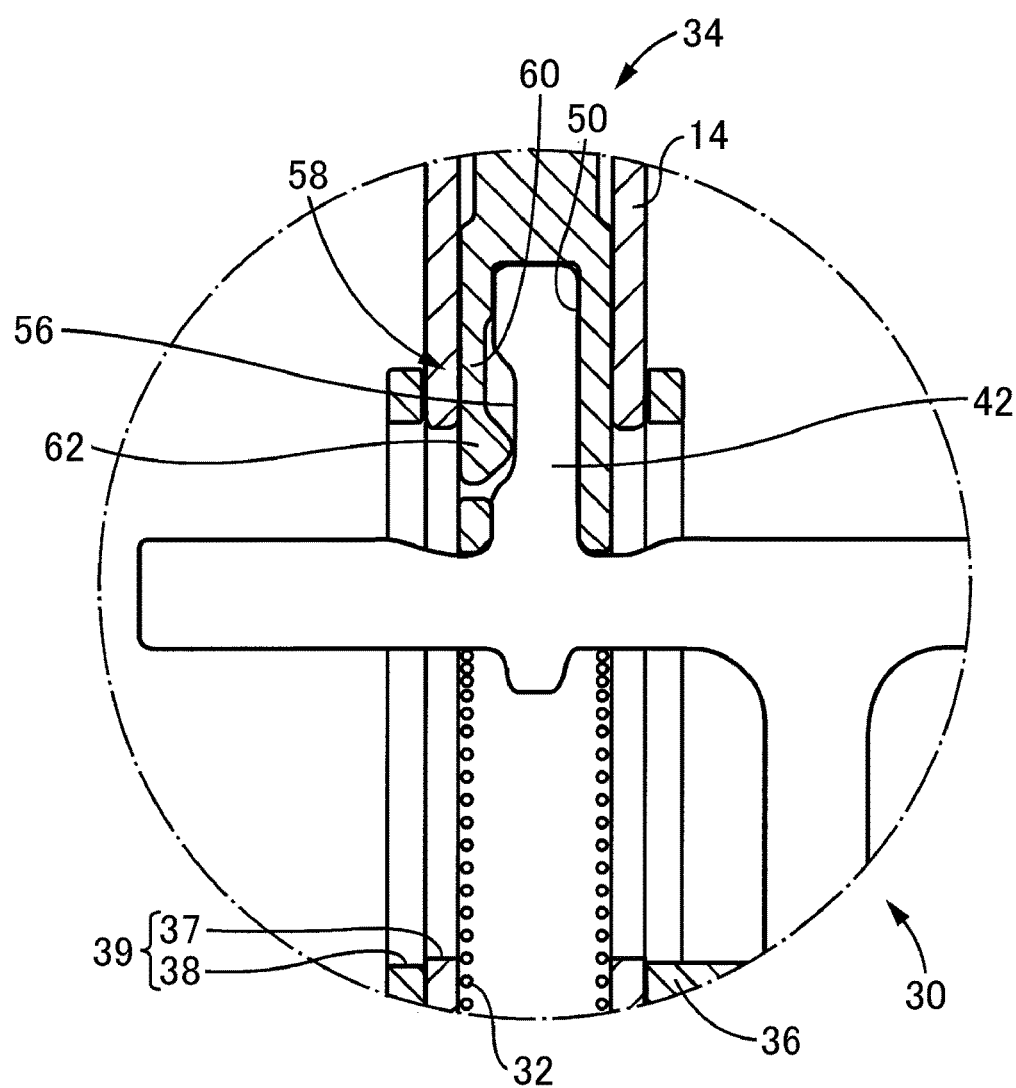
FIG. 12 is a cross-sectional view corresponding to FIG. 10 and showing an assembled state of the detent pin and the detent rod where a retaining pawl of the detent rod shown in FIG. 5 is engaged with an engaging recess of the fitting protrusion of the detent pin.
Figure 13:
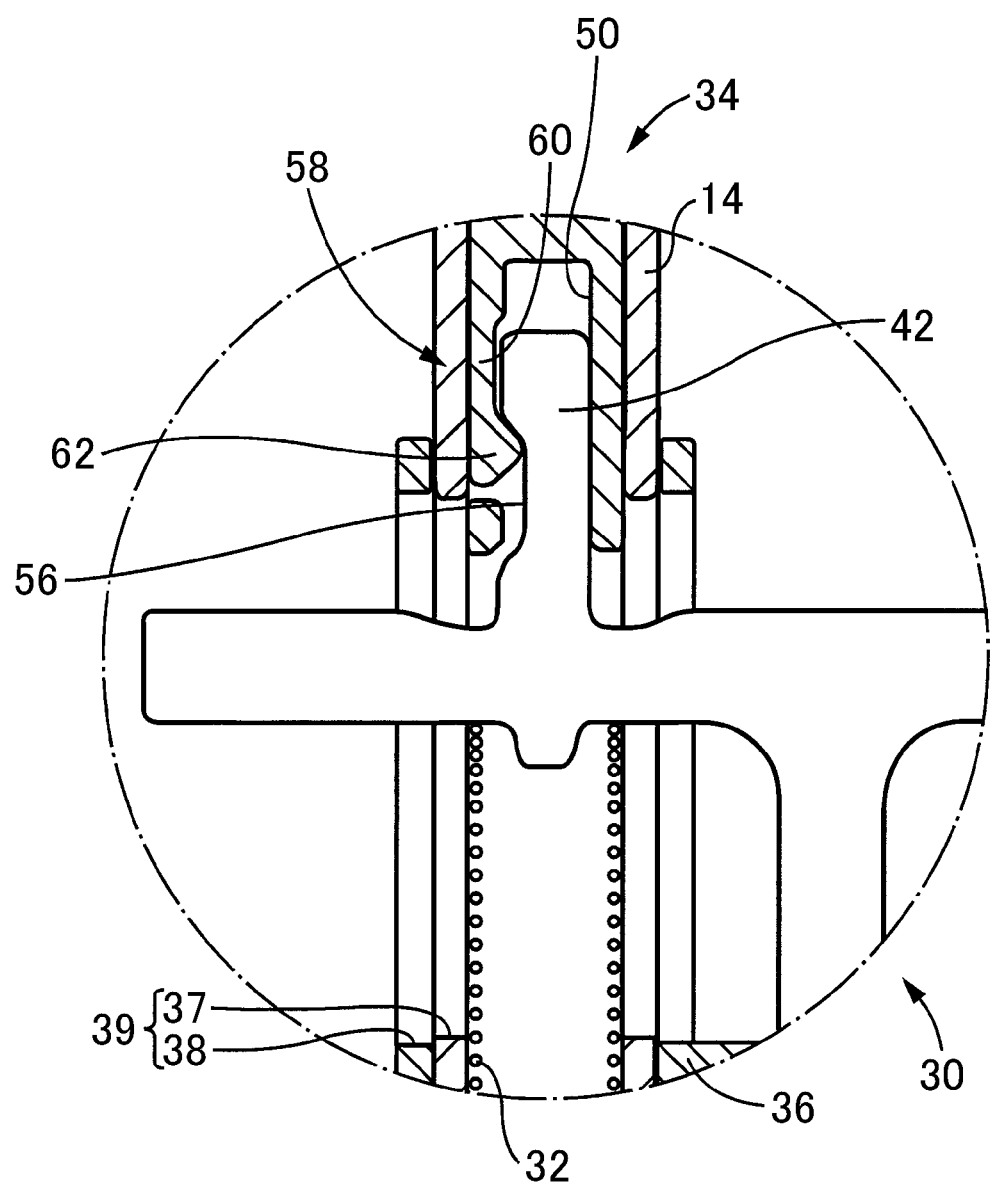
FIG. 13 is a cross-sectional view that shows a state where the detent rod has been moved away from the detent pin from the assembled state shown in FIG. 12.

Next, a step of assembling the detent rod 34 and the detent pin 30 among steps of assembling the members of the shift lever 18 will be described with reference to FIG. 10 to FIG. 13. FIG. 10 to FIG. 13 are enlarged cross-sectional views that show a portion around the fitting protrusion 42 of the detent pin 30 and the fitting hole 50 of the detent rod 34. In FIG. 10 and FIG. 11, the length of each of the lever pipe-side elongated holes 37 in the longitudinal direction is indicated by the arrow a. First, the detent rod 34 inserted in the lever pipe 14 through the upper opening of the lever pipe 14 in a state where the fitting hole 50 is oriented downward is inserted through the elongated holes 39 of the assembly 28 such that both ends protrude from the elongated holes 39, and is then lowered downward toward the fitting protrusion 42 of the detent pin 30 arranged on the other end face of the spring 32 of which one end face is supported by the support portion 36 of the assembly 28. At this time, downward force against the urging force of the spring 32 is applied to the detent pin 30 such that the fitting protrusion 42 of the detent pin 30 is located at the same position in the axial direction as the elongated holes 39 of the assembly 28. FIG. 10 is a view that shows a state of the detent rod 34 and the detent pin 30 just before the protruded end of the fitting protrusion 42 of the detent pin 30 is fitted into the fitting hole 50 of the detent rod 34 and contacts with the guide inclined face 64 of the inward latch pawl 62 as a result of lowering of the detent rod 34. The detent rod 34 is further lowered toward the fitting protrusion 42 of the detent pin 30 located in the elongated holes 39, and the guide inclined face 64 is caused to be in sliding contact with the protruded edge of the fitting protrusion 42. Thus, the neck 60 is opened inside one of the elongated holes 39. FIG. 11 is a view that shows a state of the detent pin 30 and the detent rod 34 where the protruded edge of the inward latch pawl 62 has reached a side wall face on the detent rod 34 side with respect to the engaging recess 56 of the fitting protrusion 42 as a result of the fact that the neck 60 opens inside one of the elongated holes 39. As the detent rod 34 is further lowered while the neck 60 is open, the opened neck 60 is elastically restored, the inward latch pawl 62 is hooked to the engaging recess 56 provided in the fitting protrusion 42 of the detent pin 30, the retaining pawl 58 is engaged with the engaging recess 56, and the fitting protrusion 42 is fitted to the fitting hole 50. FIG. 12 is a view that shows an assembled state of the detent pin 30 and the detent rod 34 where the retaining pawl 58 and the engaging recess 56 are engaged with each other and fitting of the fitting protrusion 42 to the fitting hole 50 has completed. In this assembled state of the detent pin 30 and the detent rod 34, the detent pin 30 is raised upward by the urging force of the spring 32, which is applied to the detent pin 30 toward the detent rod 34, and then the neck 60 is located inside the lever pipe 14. Because the outside diameter of the peripheral wall of the fitting hole 50 is substantially equal to the inside diameter of the lever pipe 14, radially outward elastic deformation of the neck 60 located inside the lever pipe 14 is restricted. Thus, movement of the inward latch pawl 62 toward the lever pipe 14, that is, the radially outward side, is restricted between the lever pipe 14 and the fitting protrusion 42 protruded from the detent pin 30, so disengagement of the retaining pawl 58 from the engaging recess 56 is blocked. For example, even when only the detent rod 34 is, for example, pulled, the neck 60 is not allowed to open radially outward toward the lever pipe 14 because the neck 60 is located inside the lever pipe 14, and movement of the inward latch pawl 62 toward the lever pipe 14 is restricted, so disengagement of the retaining pawl 58 from the engaging recess 56 is blocked. FIG. 13 is a view that shows a state where only the detent rod 34 is raised after assembling of the detent pin 30 and the detent rod 34 has completed.

As described above, with the shift device 10 according to the present embodiment, the retaining pawl 58 that is engaged with the engaging recess 56 provided in the fitting protrusion 42 protruded from the detent pin 30 toward the detent rod 34 is provided in the peripheral wall of the fitting hole 50 provided at the lower end of the detent rod 34. The retaining pawl 58 includes the elastically deformable neck 60 and the inward latch pawl 62 that protrudes from the distal end of the neck 60 toward the fitting protrusion 42 and that is hooked to the engaging recess 56 provided in the detent pin 30. In an assembled state of the detent pin 30 and the detent rod 34, radially outward elastic deformation of the neck 60 located inside the lever pipe 14 by the urging force of the spring 32 is restricted. Thus, movement of the inward latch pawl 62 toward the lever pipe 14, that is, the radially outward side, is restricted between the lever pipe 14 and the fitting protrusion 42 protruded from the detent pin 30, so disengagement of the inward latch pawl 62 from the engaging recess 56 is blocked. Thus, disengagement of the detent rod 34 from the detent pin 30 is prevented.

Second Embodiment

Next, a second embodiment of the disclosure will be described. In the following embodiment, like reference numerals denote portions substantially common to the above-described embodiment in functions, and the detailed description is omitted.

Figure 14:
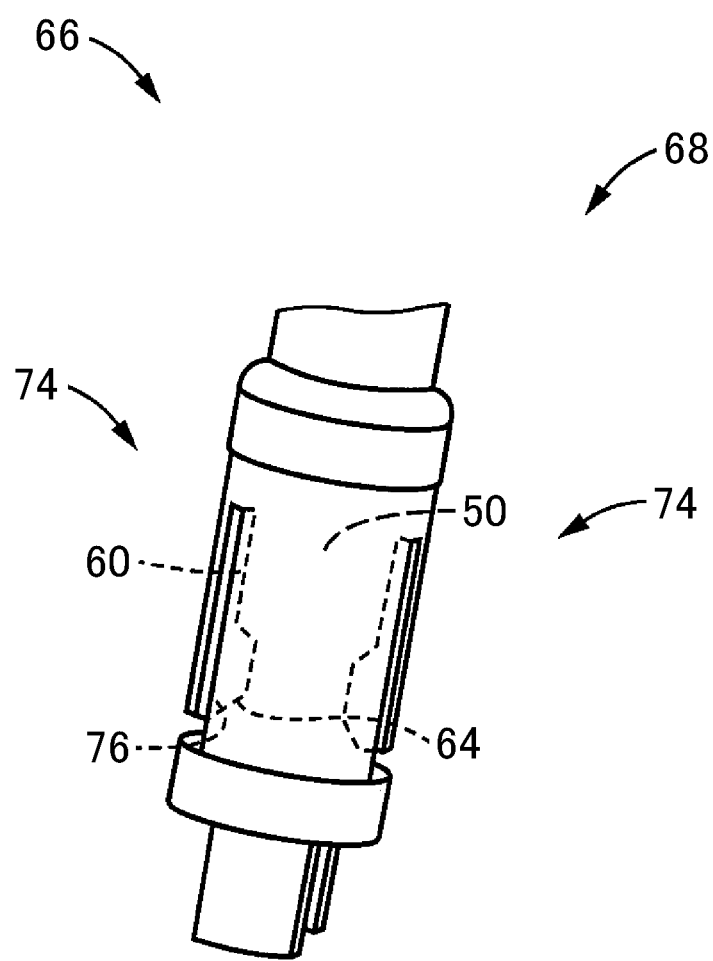
FIG. 14 is an enlarged view of the lower end of a detent rod applied to a shift lever of a shift device for a vehicle according to another embodiment of the disclosure.
Figure 15:
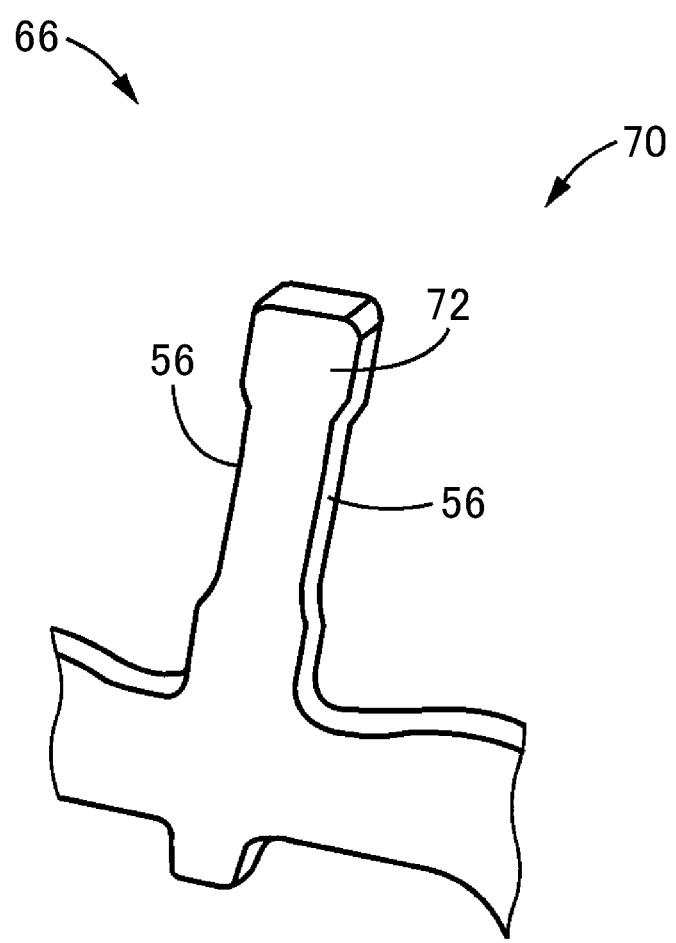
FIG. 15 is an enlarged view that shows a fitting protrusion of a detent pin that is fitted to the detent rod shown in FIG. 14.

FIG. 14 is an enlarged view of the lower end of a detent rod 68 of a shift device 66 for a vehicle according to the second embodiment. FIG. 15 is an enlarged view of a portion around a fitting protrusion 72 of a detent pin 70 of the shift device 66 according to the second embodiment. The detent pin 70 has a pair of engaging recesses 56. The pair of engaging recesses 56 are provided such that both side wall faces of the fitting protrusion 72 protruded toward the detent rod 68 in the longitudinal direction of the detent pin 70 are close to each other. The detent rod 68 includes a pair of retaining pawls 74 at its lower end. The pair of retaining pawls 74 are respectively engaged with the engaging recesses 56. Each of the retaining pawls 74 includes the elastically deformable neck 60 and an inward latch pawl 76. The inward latch pawl 76 is hooked to the corresponding engaging recess 56 provided at the distal end of the neck 60.

Figure 16:
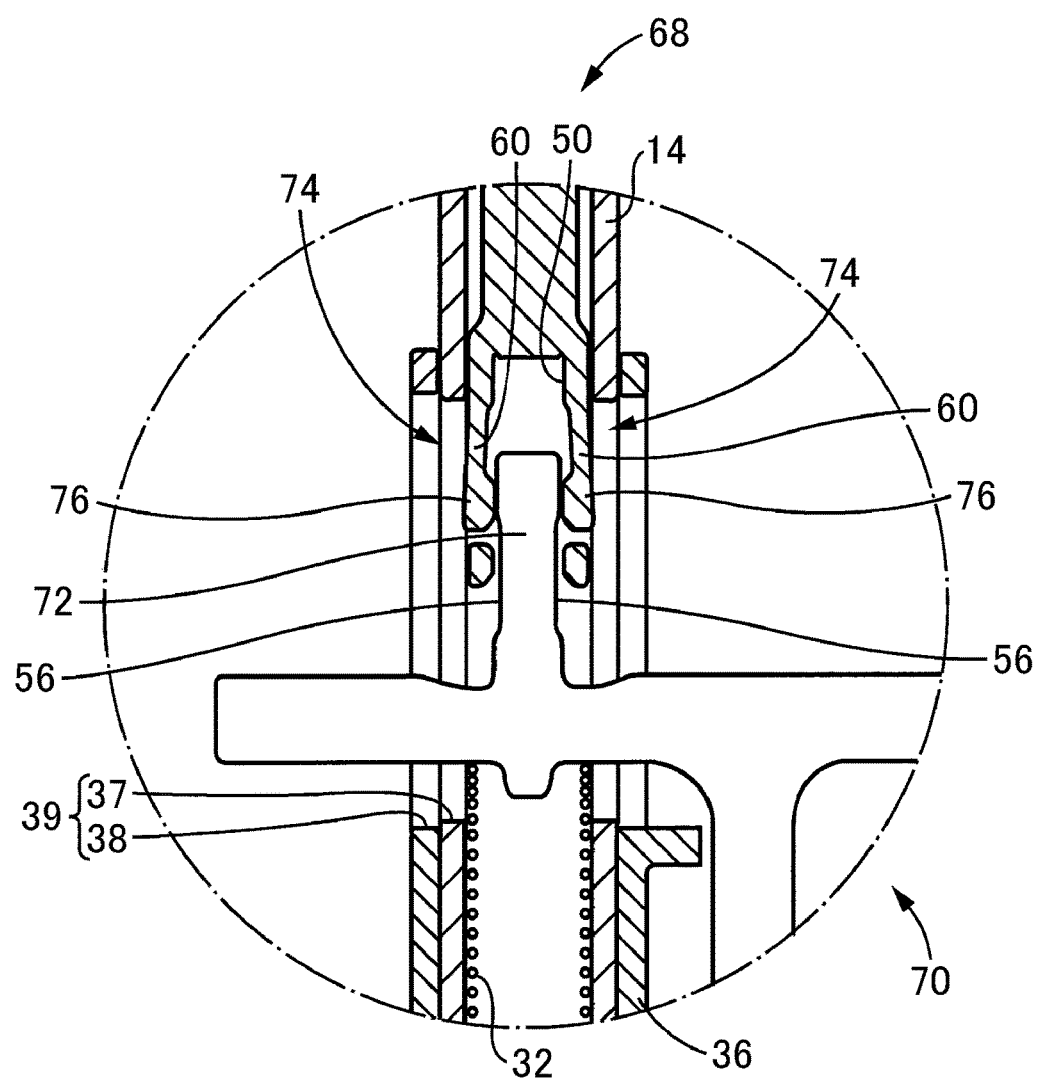
FIG. 16 is a cross-sectional view taken along a plane including the axis of the lever pipe, showing a state where the distal ends of a pair of inward latch pawls have moved radially outward through the corresponding elongated holes for the detent pin in a step of assembling the detent rod shown in FIG. 14 and the detent pin shown in FIG. 15.
Figure 17:
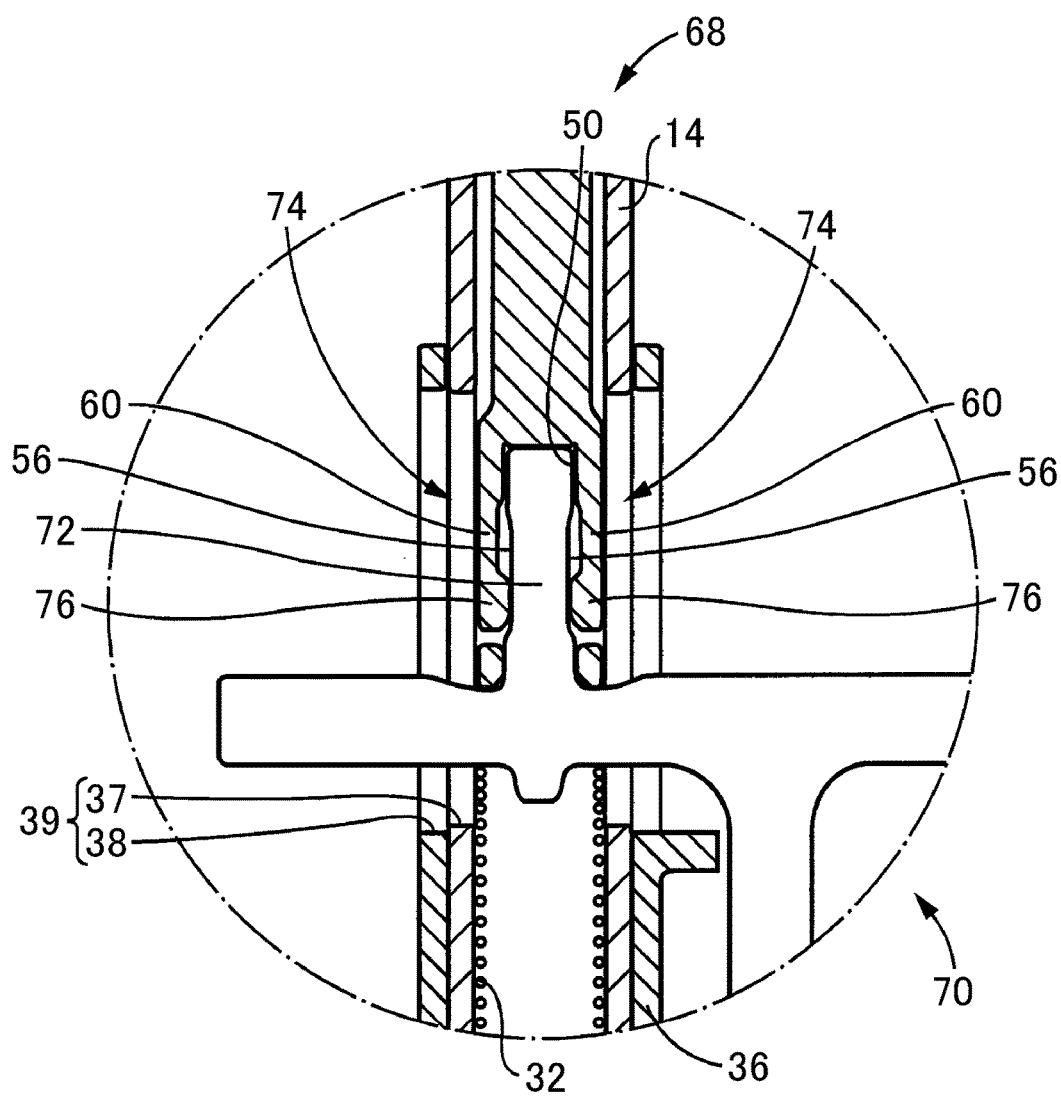
FIG. 17 is a view corresponding to FIG. 16, showing a state where the pair of inward latch pawls of the detent rod are engaged with a pair of engaging recesses of the detent pin and the fitting protrusion is fitted to a fitting hole.

Next, a step of assembling the detent rod 68 and the detent pin 70 will be described with reference to FIG. 16 and FIG. 17. FIG. 16 and FIG. 17 are enlarged cross-sectional views of a portion around the fitting protrusion 72 of the detent pin 70 and the fitting hole 50 of the detent rod 68. The detent rod 68 inserted in the lever pipe 14 from the upper opening of the lever pipe 14 in a state where the fitting hole 50 is oriented downward is lowered downward toward the fitting protrusion 72 of the detent pin 70 arranged on the other end face of the spring 32, and the guide inclined faces 64 are caused to be in sliding contact with the protruded edge of the fitting protrusion 72. Thus, the necks 60 of the pair of retaining pawls 74 are opened inside the corresponding elongated holes 39 in a direction in which the necks 60 are distanced radially outward away from each other. FIG. 16 is a view that shows a state of the detent pin 70 and the detent rod 68 where the inward latch pawls 76 have reached side wall faces on the detent rod 68 side with respect to the pair of engaging recesses 56 of the fitting protrusion 72 as a result of the fact that the necks 60 open inside the corresponding elongated holes 39. At this time, downward force against the urging force of the spring 32 is applied to the detent pin 70 such that the detent pin 70 is located at the position at which the necks 60 are allowed to open radially outward. As the detent rod 68 is further lowered while the necks 60 are open, the opened necks 60 are elastically restored radially inward in a direction to approach each other, the inward latch pawls 76 are respectively hooked to the engaging recesses 56 provided in the fitting protrusion 72 of the detent rod 68, the pair of retaining pawls 74 are respectively engaged with the pair of engaging recesses 56, and the fitting protrusion 72 is fitted to the fitting hole 50. FIG. 17 is a view that shows a state where the pair of retaining pawls 74 are respectively engaged with the pair of engaging recesses 56, fitting of the fitting protrusion 72 to the fitting hole 50 has completed and force from the detent rod 68 toward the detent pin 70 is still applied. As the above-described force is not applied in this state, the detent pin 70 is raised upward by the urging force of the spring 32 toward the detent rod 68, which is applied to the detent pin 70, with the result of shifting into an assembled state of the detent rod 68 and the detent pin 70 where the necks 60 are located inside the lever pipe 14. In the assembled state, radially outward elastic deformation of the necks 60 located inside the lever pipe 14 is restricted. Thus, movement of the inward latch pawls 76 toward the lever pipe 14, that is, the radially outward side, is restricted between the lever pipe 14 and the fitting protrusion 72 protruded from the detent pin 70, so disengagement of the retaining pawls 74 from the engaging recesses 56 is blocked. With the shift device 66 according to the present embodiment, similar advantageous effects to those of the above-described first embodiment are obtained.

With the shift device 66 according to the present embodiment, the pair of retaining pawls 74 that are engaged with the pair of engaging recesses 56 provided on both side wall faces of the fitting protrusion 72 of the detent pin 70 in the axial direction of the detent pin 70 are provided at the lower end of the detent rod 68. For this reason, because each of the retaining pawls 74 of the detent rod 68 is engageable with any one of the pair of engaging recesses 56, the detent rod 68 is allowed to be assembled to the detent pin 70 while the detent rod 68 is turned by 180 degrees around its axis.

Third Embodiment

Figure 18:
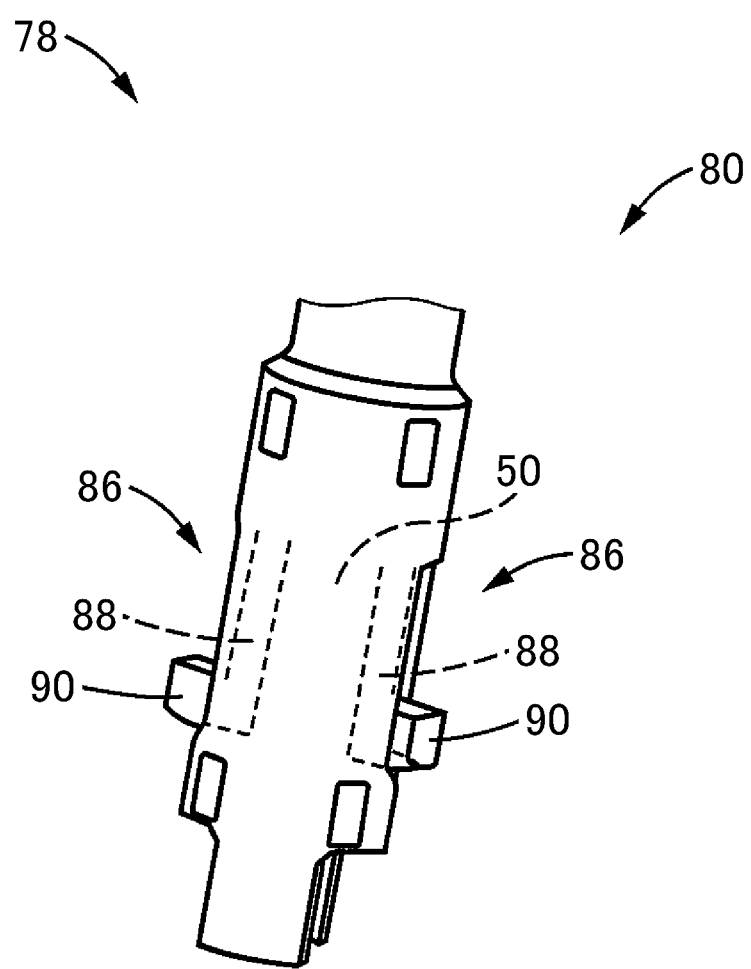
FIG. 18 is an enlarged view of the lower end of a detent rod applied to a shift lever of a shift device for a vehicle according to further another embodiment of the disclosure.
Figure 19:
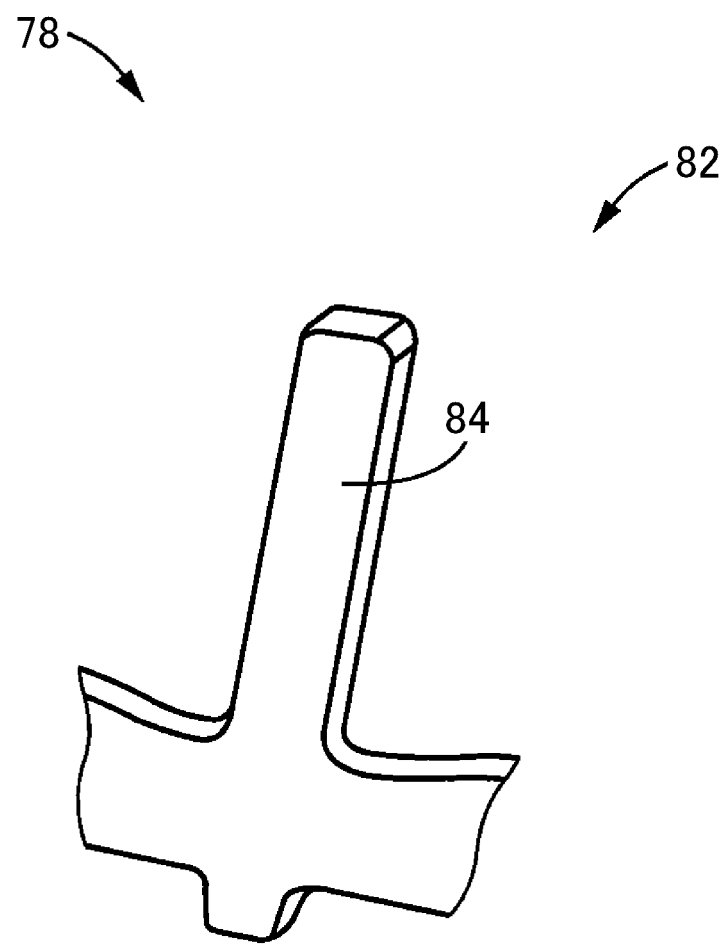
FIG. 19 is an enlarged view of a fitting protrusion of a detent pin that is fitted to the detent rod shown in FIG. 18.

FIG. 18 is an enlarged view of the lower end of a detent rod 80 of a shift device 78 for a vehicle according to a third embodiment. FIG. 19 is an enlarged view of a portion around a fitting protrusion 84 of a detent pin 82 of the shift device 78 according to the third embodiment. The detent pin 82 includes the fitting protrusion 84 protruded toward the detent rod 80. The detent rod 80 includes a pair of retaining pawls 86 at its lower end. The pair of retaining pawls 86 are respectively engaged with the elongated holes 39 provided in the assembly 28. The retaining pawls 86 include elastically deformable necks 88 and a pair of outward latch pawls 90. Each of the necks 88 extends downward in a thin plate shape with a smaller thickness than the peripheral wall of the fitting hole 50 from part of the upper edge of a corresponding one of cutouts provided in the peripheral wall so as to be opposed to each other. The pair of outward latch pawls 90 respectively protrude radially outward from the distal ends of the necks 88 toward the lever pipe 14, and are respectively hooked to the elongated holes 39 provided in the lever pipe 14 of the assembly 28. The distance between the protruded ends of the pair of outward latch pawls 90 at the time when the outward latch pawls 90 are not radially moved is larger than the inside diameter of the lever pipe 14.

Figure 20:
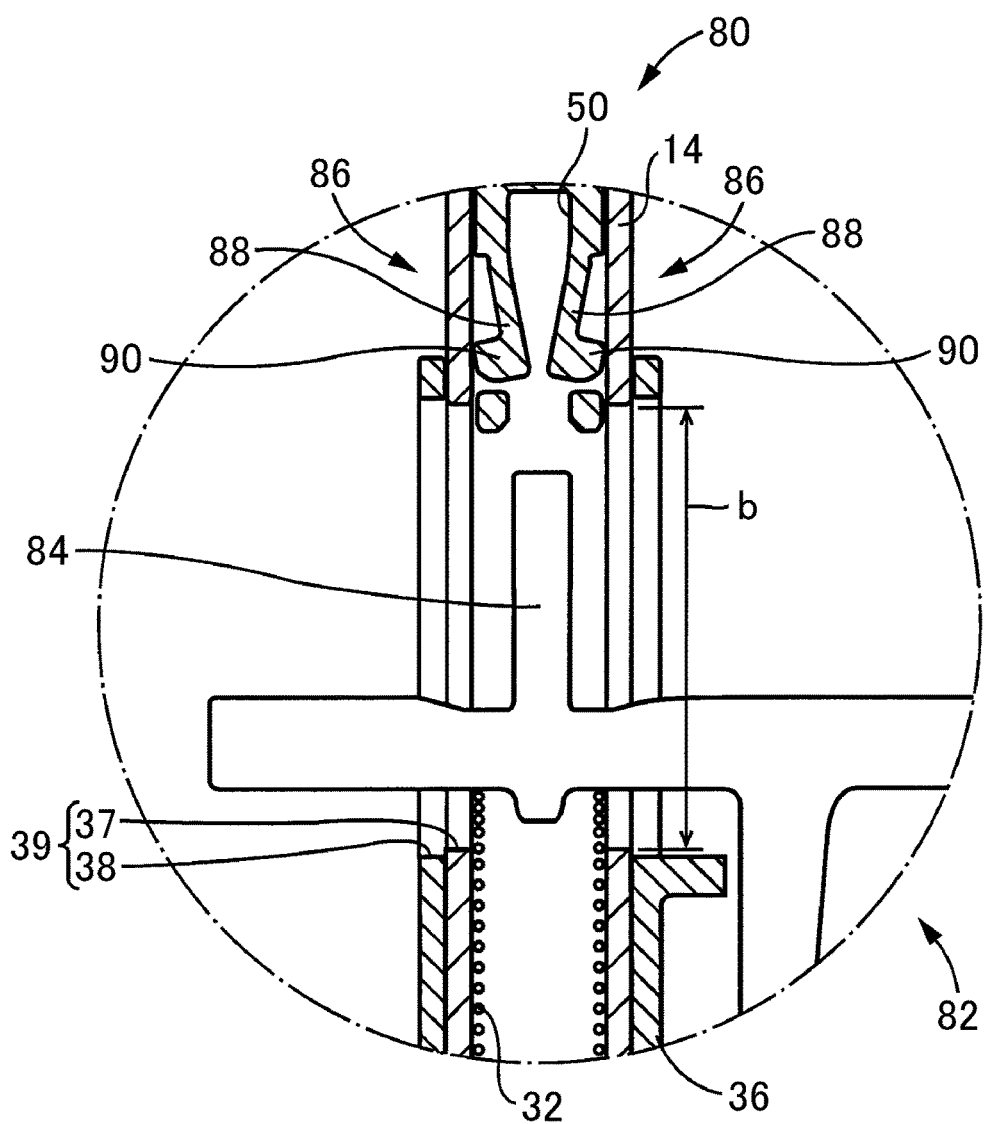
FIG. 20 is a cross-sectional view taken along a plane including the axis of the lever pipe, showing a state where outward latch pawls of the detent rod have moved radially inward inside the lever pipe in a step of assembling the detent rod shown in FIG. 18 and the detent pin shown in FIG. 19.
Figure 21:
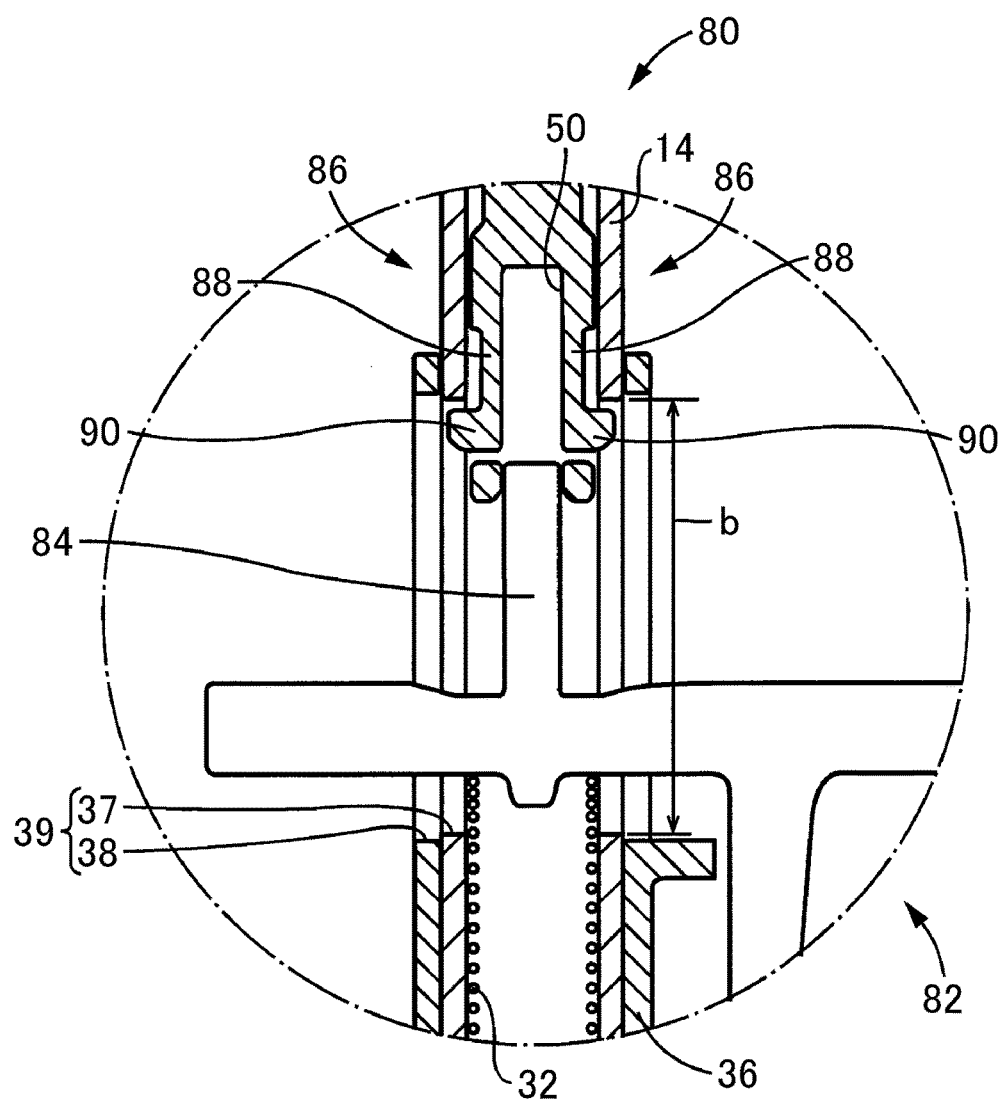
FIG. 21 is a view corresponding to FIG. 20 and showing a state where the outward latch pawls of the detent rod are respectively hooked to elongated holes for the detent rod.
Figure 22:
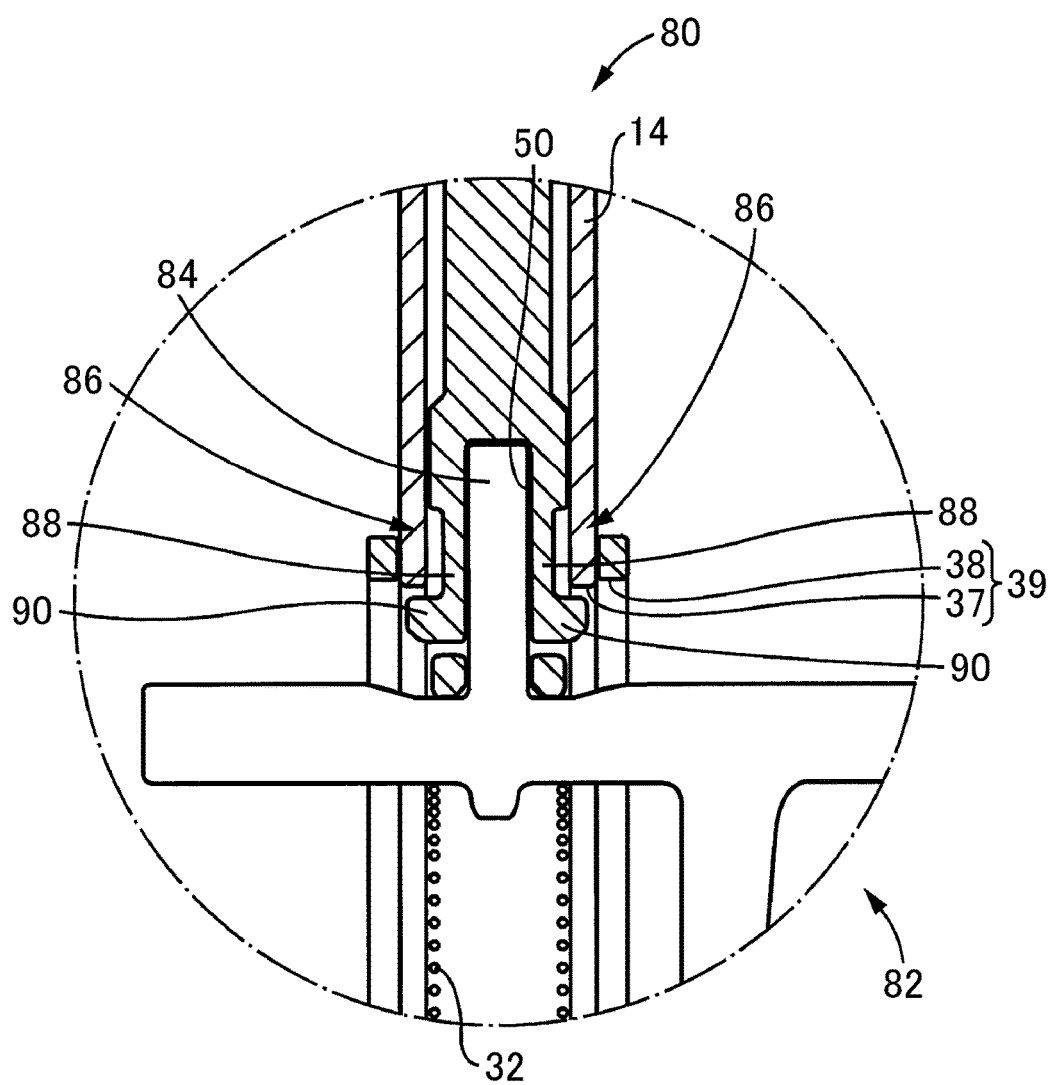
FIG. 22 is a view corresponding to FIG. 20 and showing a state where a fitting protrusion of the detent pin is fitted to a fitting hole of the detent rod and radially inward movement of the outward latch pawls is blocked.

Next, a step of assembling the detent rod 80 and the detent pin 82 will be described with reference to FIG. 20 to FIG. 22. FIG. 20 to FIG. 22 are enlarged cross-sectional views of a portion around the fitting protrusion 84 of the detent pin 82 and the fitting hole 50 of the detent rod 80. In FIG. 20 and FIG. 21, the length of each of the lever pipe-side elongated holes 37 in the longitudinal direction is indicated by the arrow b. First, the detent rod 80 is inserted from the upper opening of the lever pipe 14 into the lever pipe 14 in a state where the fitting hole 50 is oriented downward. FIG. 20 is a view that shows a state where the detent rod 80 inserted in the lever pipe 14 is lowered to near the elongated holes 39. In this way, the detent rod 80 is lowered inside the lever pipe 14 in a state where the necks 88 are deformed radially inward and the outward latch pawls 90 are in sliding contact with the inner periphery of the lever pipe 14. Subsequently, until the necks 88 of the detent rod 80 are elastically restored radially outward, the detent rod 80 is further lowered toward the fitting protrusion 84 of the detent pin 82 arranged on the other end face of the spring 32. FIG. 21 is a view that shows a state where the necks 88 are elastically restored radially outward and the outward latch pawls 90 are respectively hooked to the lever pipe-side elongated holes 37. As the necks 88 are moved radially outward, the opening of the fitting hole 50 opens such that the fitting protrusion 84 of the detent pin 82 is fittable to the fitting hole 50. At this time, force in a direction opposite from the urging force of the spring 32 toward the detent rod 80 is applied to the detent pin 82 such that the detent pin 82 is located at the position at which the necks 88 are allowed to be elastically restored radially outward. Subsequently, the fitting protrusion 84 of the detent pin 82 is fitted to the fitting hole 50 of the detent rod 80 by lowering the detent rod 80 toward the fitting protrusion 84 of the detent pin 82. FIG. 22 is a view that shows an assembled state of the detent rod 80 and the detent pin 82 where the fitting protrusion 84 of the detent pin 82 is fitted to the fitting hole 50 of the detent rod 80 and then the detent pin 82 is raised upward toward the detent rod 80 by the urging force of the spring 32. In this assembled state, because the fitting protrusion 84 of the detent pin 82 is fitted to the fitting hole 50 of the detent rod 80 inside the lever pipe 14, radially inward movement of the necks 88 is restricted by the fitting protrusion 84. Thus, in the assembled state, movement of the outward latch pawls 90 toward the fitting protrusion 84, that is, the radially inward side, is restricted between the lever pipe 14 and the fitting protrusion 84 protruded from the detent pin 82, so disengagement of the retaining pawls 86 from the elongated holes 37 is prevented.

As described above, in the shift device 78 according to the present embodiment, the retaining pawls 86 that are hooked to the lever pipe-side elongated holes 37 of the lever pipe 14 are provided in the peripheral wall of the fitting hole 50 provided at the lower end of the detent rod 80. The retaining pawls 86 include the elastically deformable necks 88 and the outward latch pawls 90 that protrude radially outward from the distal ends of the necks 88 toward the lever pipe 14 and that are hooked to the lever pipe-side elongated holes 37. In an assembled state of the detent pin 82 and the detent rod 80, the fitting protrusion 84 is fitted to the fitting hole 50 located inside the lever pipe 14 by the urging force of the spring 32, and radially inward elastic deformation of the necks 88 is restricted by the fitting protrusion 84. For this reason, radially inward movement of the outward latch pawls 90 toward the fitting protrusion 84 is restricted between the lever pipe 14 and the fitting protrusion 84 protruded from the detent pin 82, and disengagement of the retaining pawls 86 from the lever pipe-side elongated holes 37 is blocked. Thus, disengagement of the detent rod 80 from the detent pin 82 is prevented.

The embodiments of the disclosure are described in detail with reference to the accompanying drawings; however, the disclosure may be implemented in another embodiment. Various modifications may be added without departing from the scope of the disclosure.

What is claimed is:
1. A shift device for a vehicle, the shift device comprising:
a housing; and
a shift lever including
a cylindrical shaft portion of which a proximal end is pivotably supported inside the housing, the cylindri- cal shaft portion having elongated holes that extend through a peripheral wall of the cylindrical shaft portion and that are elongated in a longitudinal direction of the cylindrical shaft portion, a shift knob fixed to a distal end of the cylindrical shaft portion, a detent pin inserted through the elongated holes in a state where both ends of the detent pin protrude from the corresponding elongated holes, and a detent rod inserted in the cylindrical shaft portion, the detent rod being configured to transmit operating force of an operating button provided in the shift knob to the detent pin, wherein the detent pin has a fitting protrusion protruded toward the detent rod, the detent rod has a fitting hole at its end, and the fitting protrusion is fitted in the fitting hole, a retaining pawl that is engaged with an engaging recess provided in the detent pin or engaged with one of the elongated holes is provided at the end of the detent rod, and in an assembled state, radial movement of the retaining pawl is restricted between the fitting protrusion and the cylindrical shaft portion, and disengagement of the retaining pawl is blocked.

2. The shift device according to claim 1, wherein
the shift lever further includes a spring, and
the detent pin is constantly urged by the spring toward the detent rod.

3. The shift device according to claim 1, wherein
the retaining pawl includes an elastically deformable neck and an inward latch pawl that protrudes from a distal end of the neck toward the fitting protrusion and that is hooked to the engaging recess, and in the assembled state, movement of the inward latch pawl toward the cylindrical shaft portion is restricted between the fitting protrusion and the cylindrical shaft portion, and disengagement of the inward latch pawl is blocked.

4. The shift device according to claim 3, wherein
a plurality of the retaining pawls are provided, and the retaining pawls are respectively engaged with a plurality of the engaging recesses.

5. The shift device according to claim 1, wherein
the retaining pawl includes an elastically deformable neck and an outward latch pawl that protrudes from a distal end of the neck toward the cylindrical shaft portion and that is hooked to one of the elongated holes, and in the assembled state, movement of the outward latch pawl toward the fitting protrusion is restricted between the fitting protrusion and the cylindrical shaft portion, and disengagement of the outward latch pawl is blocked.

6. The shift device according to claim 5, wherein
a plurality of the retaining pawls are provided, and the retaining pawls are respectively engaged with the elongated holes.

* * * * *